United States Patent [19]

Wall

[11] Patent Number: 5,094,332

[45] Date of Patent: Mar. 10, 1992

[54] DIGITAL CONTROL SYSTEM FOR ELECTROMAGNETIC CLUTCH

[75] Inventor: John H. Wall, Columbia City, Ind.

[73] Assignee: Dana Corporation, Toledo, Ohio

[21] Appl. No.: 644,075

[22] Filed: Dec. 31, 1990

[51] Int. Cl.⁵ .................... F16D 27/00; F16D 43/04; F16D 43/25
[52] U.S. Cl. ................ 192/82 T; 192/84 R; 192/103 R
[58] Field of Search ........... 192/84 R, 52, 21.5, 192/82 T, 0.032, 103 R; 361/154

[56] References Cited

U.S. PATENT DOCUMENTS

| | | |
|---|---|---|
| 2,718,951 | 9/1955 | Mason . |
| 3,172,020 | 3/1965 | Spinelli et al. . |
| 3,335,829 | 8/1967 | Castelet ............... 192/84 R X |
| 3,402,793 | 9/1968 | Scholl ................. 192/84 R X |
| 3,989,129 | 11/1976 | Brandenstein ........... 192/84 R |
| 4,214,290 | 7/1980 | Sloan .................. 361/154 |
| 4,376,476 | 3/1983 | Hagiri ................. 192/84 R |
| 4,425,992 | 1/1984 | Makita ................. 192/21.5 X |
| 4,509,091 | 4/1985 | Booth .................. 361/154 |
| 4,526,257 | 7/1985 | Mueller ................ 192/48.2 |
| 4,535,879 | 8/1985 | Sturges ................ 192/52 |
| 4,567,975 | 2/1986 | Roll ................... 192/84 C |
| 4,609,965 | 9/1986 | Baker .................. 361/160 |
| 4,620,261 | 10/1986 | Thornton ............... 361/154 |
| 4,635,774 | 1/1987 | Sekiguchi et al. ....... 192/52 |
| 4,636,912 | 1/1987 | Ohtani ................. 361/154 |
| 4,649,458 | 3/1987 | Arai et al. ............ 361/152 |
| 4,650,052 | 3/1987 | Okada .................. 192/84 C |
| 4,679,116 | 7/1987 | Oshizawa et al. ........ 361/154 |
| 4,723,644 | 2/1988 | Sakakiyama ............. 192/21.5 X |
| 4,730,712 | 3/1988 | Ohkumo ................. 192/21.5 X |
| 4,734,817 | 3/1988 | Baker et al. ........... 361/190 |
| 4,749,073 | 6/1988 | Olsen .................. 192/52 |
| 4,805,751 | 2/1989 | Ohkumo et al. .......... 192/21.5 X |
| 4,905,801 | 3/1990 | Tezuka ................. 192/21.5 X |
| 4,977,988 | 12/1990 | Tanaka ................. 192/21.5 X |

Primary Examiner—Rodney H. Bonck
Attorney, Agent, or Firm—MacMillan, Sobanski & Todd

[57] ABSTRACT

A soft start controller for regulating the engagement and disengagement of an electromagnetic clutch is disclosed. The controller includes a microprocessor which, in response to an engagement signal, causes electrical current to be provided to a coil of the clutch. A plurality of sensors are provided for generating electrical signals which are representative of various operating conditions of the clutch, such as engine load, clutch temperature and the like. These signals are selectively fed through a multiplexer and an analog to digital converter to the microprocessor. The microprocessor samples the signals generated by the sensors and controls the magnitude of the current fed to the coil of the clutch in response thereto. A plurality of manually operable start select switches are provided for selecting one of a plurality of clutch current curves stored in a memory of the microprocessor for use. Alternatively, the microprocessor may be programmed to select one of the clutch current curves in accordance with the sensed operating conditions. The microprocessor may also be responsive to the sensed operating conditions for automatically engaging or disengaging the clutch under certain conditions.

58 Claims, 3 Drawing Sheets

DIGITAL CONTROL SYSTEM FOR ELECTROMAGNETIC CLUTCH

BACKGROUND OF THE INVENTION

This invention relates in general to control devices for electromagnetic clutches and in particular to a microprocessor based control system for regulating the engagement and disengagement of an electromagnetic clutch.

Clutches are well known devices which selectively connect an input shaft to an output shaft for rotation together. In some clutches, an electromagnet is used to effect this engagement and disengagement. Electromagnetic clutches typically include a rotor and an armature, both of which are generally annular in shape and are supported for rotation about a common axis. The armature is usually connected to the input shaft of the clutch, while the rotor is usually connected to the output shaft. Normally, the armature is spaced apart from the rotor by a relatively small air gap. In this position, the clutch is disengaged, and there is no driving connection between the armature and the rotor. However, the armature can be moved axially into frictional engagement with the rotor. In this position, the clutch is engaged such that the armature and the rotor (and, therefore, the input and output shafts) rotate together.

To effect movement of the armature, and thereby cause the clutch to be engaged, a coil of wire is provided. The coil is generally carried on or supported by a stationary core located adjacent to the rotor. To engage the clutch, an electric current is passed through the coil. The flow of current causes the coil to generate a magnetic field which attracts the axially movable armature toward the axially stationary rotor. When the armature has travelled completely through the air gap, it frictionally engages the rotor as described above, thus connecting the input and output shafts for rotation together. To disengage the clutch, the flow of electric current through the coil is discontinued. In the absence of the magnetic field, a return spring moves the armature out of frictional engagement with the rotor.

As mentioned above, a magnetic field is generated by the coil when the electric current begins to flow therethrough. As the magnitude of the current increases, the intensity of the magnetic field also increases. When the magnetic field intensity is sufficiently large, the armature will begin moving axially toward the rotor. If the magnitude of the electric current is not closely controlled thereafter, the velocity of the armature will increase as it travels toward the rotor, resulting in almost instantaneous engagement of the clutch. Such abrupt clutch engagement has several undesirable side effects, such as the rapid loss of speed of the input shaft, the creation of undue shocks and strains, and the generation of unpleasant noise.

Many control devices are known for avoiding these abrupt engagement problems by regulating the electric current applied to the coil such that armature engages the rotor in a relatively slow and controlled manner. These devices are often referred to as soft start clutch controllers. While known controllers are generally effective for causing relatively soft engagement of the armature with the rotor, they have been found to suffer from several drawbacks. First, they are usually not responsive to external conditions for automatically controlling the operating condition of the clutch (i.e., automatically disengaging the clutch under certain conditions). Second, they do not adjust the magnitude of electric current supplied to the coil in response to changing operating conditions, such as speed, ambient temperature, and the like. Last, they are not readily manually adjustable to compensate for such changing operating conditions. Thus, it would be desirable to provide an improved soft start controller for an electromagnetic clutch which is capable of performing these tasks.

SUMMARY OF THE INVENTION

This invention relates to an improved soft start controller for regulating the engagement and disengagement of an electromagnetic clutch. The controller includes a microprocessor which, in response to an engagement signal, causes electrical current to be provided to a coil of the clutch. A plurality of sensors are provided for generating electrical signals which are representative of various operating conditions of the clutch, such as engine load, clutch temperature and the like. These signals are selectively fed through a multiplexer to the input of an analog to digital converter. The output of the converter is fed to the microprocessor. The microprocessor samples the signals generated by the sensors and controls the magnitude of the current fed to the coil of the clutch in response thereto. A plurality of manually operable start select switches are provided for selecting one of a plurality of clutch current curves stored in a memory of the microprocessor for use. The start select switches permit an operator to select a specific clutch current curve for use. Alternatively, the microprocessor may be programmed to select one of the clutch current curves in accordance with the sensed operating conditions. The microprocessor may also be responsive to the sensed operating conditions for automatically engaging or disengaging the clutch under certain conditions.

It is an object of this invention to provide a microprocessor based soft start controller for regulating the engagement and disengagement of an electromagnetic clutch in accordance with one or more operating conditions thereof.

It is another object of this invention to provide such a soft start clutch controller which is capable of causing clutch engagement according to a plurality of different soft start characteristics.

It is a further object of this invention to provide such a digital clutch controller which is responsive to external conditions for automatically controlling the operating condition of the clutch.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
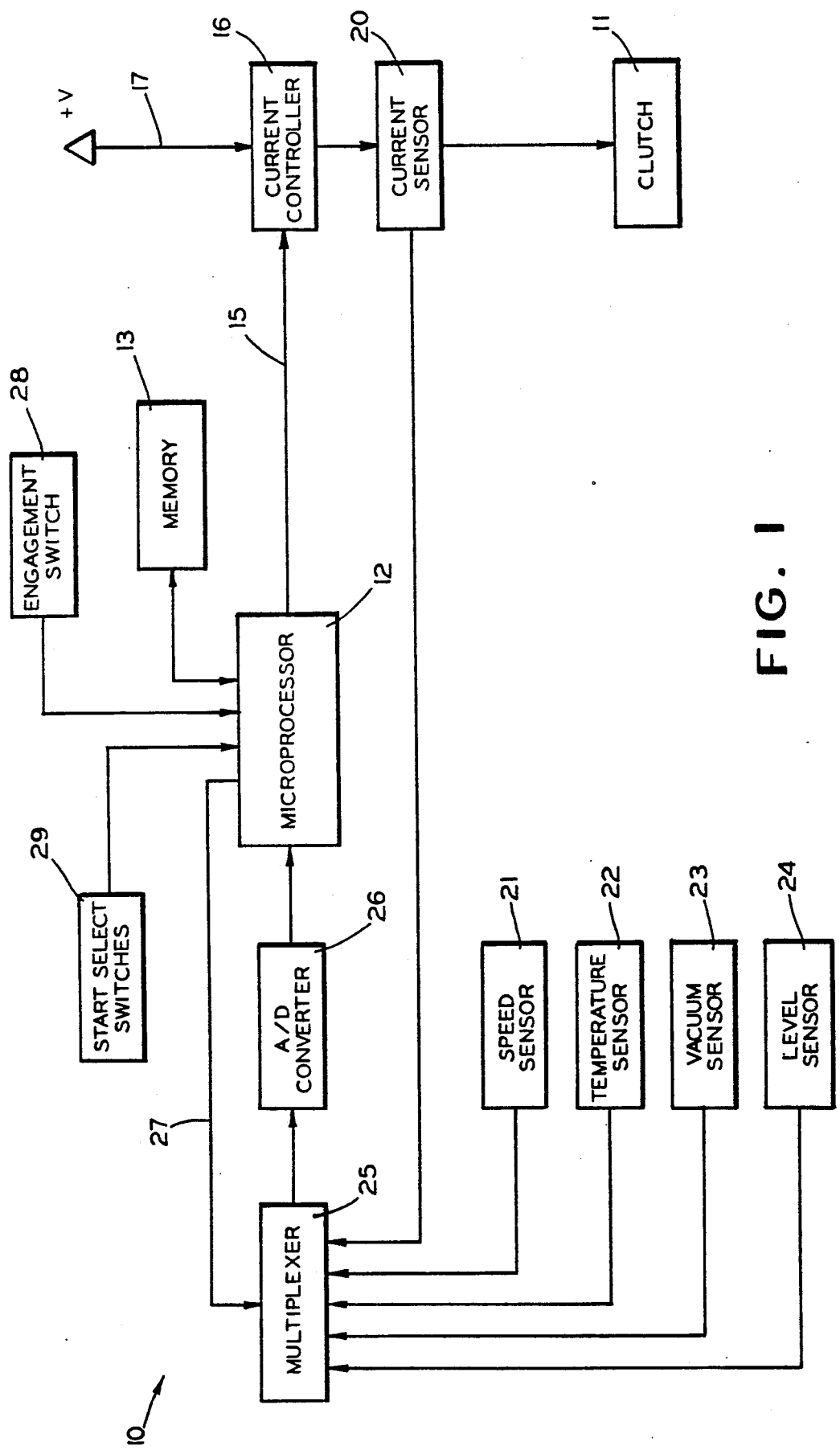
FIG. 1 is a block diagram of a soft start controller for regulating the engagement and disengagement of an electromagnetic clutch in accordance with this invention.

Referring now to the drawings, there is illustrated in FIG. 1 a block diagram of a soft start controller, indicated generally at 10, for regulating the engagement and disengagement of an electromagnetic clutch 11 in accordance with this invention. The clutch 11 is conventional in the art and may be embodied as shown in U.S. Pat. No. 4,749,965 to Olsen, owned by the assignee of this invention. The clutch 11 is typically connected between a source of rotational power and a controlled device to selectively provide a driving relationship therebetween. For example, the clutch 11 may be connected between an engine and an air conditioning compressor of a vehicle so that the compressor is selectively driven by the engine.

The controller 10 includes a microprocessor 12, which may be an 8749AH series microprocessor manufactured by Intel Corporation. A memory circuit 13 is connected to the microprocessor 12 for storing the various programs and data for use by the microprocessor 12, as well as for storing other data generated by the microprocessor 12. The memory circuit 13 may be included as part of the microprocessor 12, as in the specific microprocessor mentioned above. The microprocessor 12 is connected through an output line 15 to a current controller 16. The current controller 16 is connected by a line 17 to a source of electrical power. The current controller 16 is also connected through a current sensor 20 to the coil (not shown) of the clutch 11. In a manner which will be discussed in detail below, the microprocessor 12 controls the operation of the current controller 16 so as to regulate the amount of electrical current supplied therethrough to the coil of the clutch 11. As a result, the engagement and disengagement of the clutch 11 is controlled in accordance with predetermined characteristics.

The current sensor 20 is conventional in the art and is adapted to generate an analog electrical signal which is representative of the magnitude of the current supplied to the clutch 11 by the current controller 16. A plurality of other sensors 21, 22, 23, and 24 are also provided. The sensors 21, 22, 23, and 24 generate analog electrical signals which are proportional to certain operating parameters of the clutch 11 itself or aspects of the operation of the vehicle. These parameters may include engine speed (as indicated by the speed sensor 21), clutch temperature (as indicated by the temperature sensor 22), engine vacuum (as indicated by the vacuum sensor 23), and the relative angle at which the vehicle is being operated (indicated by the level sensor 24). Other sensors may be provided for sensing other parameters.

The sensors 20 through 24 are connected through a multiplexer 25 to an analog to digital converter 26. The multiplexer 25 and the converter 26 are both conventional in the art. The multiplexer 25 may be an LF13508 multiplexer manufactured by National Semiconductor Corp., while the converter may be an ADC0804 converter manufactured by National Semiconductor Corp. In response to signals generated by the microprocessor 12 over a control line 27, the multiplexer 25 selects one of the signals from the sensors 20 through 24 and passes that signal to the converter 26. Typically, the sensors 20 through 24 are sequentially sampled at a predetermined rate by the microprocessor 12. However, the microprocessor 12 can be programmed to sample some of the sensors more frequently than others if desired. The selected analog signals from the sensors 20 through 24 are converted to equivalent digital signals by the converter 26, then fed to data inputs of the microprocessor 12.

An engagement switch 28 is connected to an input of the microprocessor 12. The engagement switch 28 may be a manually operable switch which is closed by an operator when it is desired to engage the clutch 11. Alternatively, the engagement switch 28 may be an electronic switch located within another system which is automatically closed when predetermined conditions are present. For example, the engagement switch 28 may be arranged to generate the signal when the air conditioner of the vehicle is turned on by the driver. In either instance, the engagement switch 28 generates an electrical signal to the microprocessor 12 indicating that engagement of the clutch 11 is to be commenced or maintained. Also, a plurality of start select switches 29 are connected to inputs of the microprocessor 12. As will be explained in detail below, the start select switches 29 are selectively opened and closed by an operator to provide information to the microprocessor 12 as to the desired nature of engagement of the clutch 11.

In operation, a signal is generated by engagement switch 28 when it is desired to engage the clutch 11. In response thereto, the microprocessor 12 generates a signal to the current controller 16 such that electrical current is supplied to the coil of the clutch 11. The current controller 16 may be embodied as a conventional power transistor or similar current controlling device. When the appropriate signal is generated by the microprocessor 12, the current controller 16 is turned on (i.e., operated in a conductive mode), thus allowing electrical current to flow from the source of electrical power to the coil of the clutch 11. As a result, the clutch 11 is engaged. As will be discussed below, the specific manner in which current is supplied to the clutch 11 is determined by several factors, such as the settings of the start select switches 29 and the various parameters sensed by the sensors 20 through 24.

Once the clutch 11 is engaged, the microprocessor 12 continues to maintain the flow of electrical current thereto until the signal from the engagement switch 28 is discontinued. At that time, the microprocessor 12 controls the current controller 16 to become non-conductive, thereby interrupting the flow of electrical current to the clutch 11 and causing it to be disengaged. However, while the engagement switch 28 is generating its signal to engage the clutch 11, the microprocessor 12 monitors the various parameters sensed by the sensors 20 through 24, as mentioned above. As will also be discussed below, the microprocessor 12 may cause the clutch 11 to be disengaged as a result of one or more of the parameters sensed by the sensors 20 through 24, even though the engagement switch 28 continues to generate its signal. In this event, the microprocessor 12 functions to override the engagement signal from the engagement switch 28.

Figure 2:
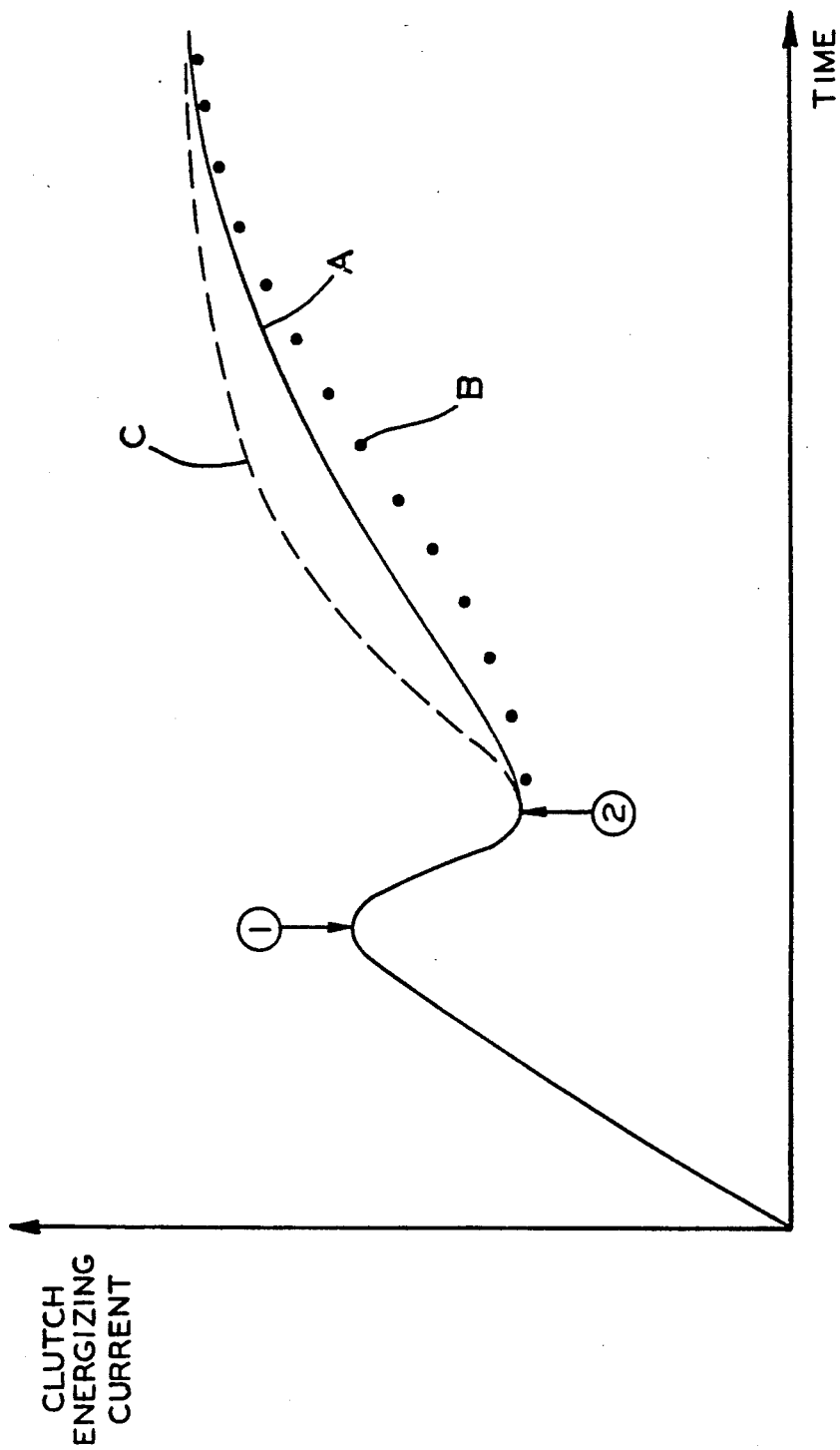
FIG. 2 is a graph illustrating a plurality of typical electromagnetic clutch energization current curves which are capable of being generated by the soft start controller illustrated in FIG. 1.

Referring now to FIG. 2, there is illustrated a graph showing a plurality of curves of the energization current supplied to the coil of the clutch 11 as a function of time. Curve A (shown by a solid line) represents a typical soft start clutch engagement current curve, wherein the current initially rises from zero at a predetermined rate. As discussed above, the current causes an electromagnetic field to be generated by the clutch coil. When the magnitude of the electromagnetic field is sufficiently large, the armature of the clutch 11 begins to move towards the rotor. At the onset of this armature movement, it has been found that a momentary decrease in the magnitude of the current passing through the coil occurs. This is shown as a peak point 1 in the Curve A. Thereafter, the coil current again increases, but at a slightly slower rate. This is shown as a valley point 2 in the Curve A. The current continues to rise until it reaches a predetermined maximum. Curves B and C (shown by a dotted and dashed lines, respectively) represent other typical soft start clutch engagement current curves. In Curve B, the current rises more slowly from the valley point 2 than in Curve A, while in Curve C, the current rises more rapidly from that valley point 2. The three curves are intended to be representative of any desired clutch current curves designed to regulate the engagement characteristics of the clutch 11.

The microprocessor 12 is programmed to regulate the current controller 16 such that the electrical current which is supplied to the clutch 11 during the engagement process follows a selected one of the three curves shown in FIG. 2 (or any other curve which is programmed into the memory circuit 13). The particular curve which is selected by the microprocessor 12 is dependent upon many factors, including the specific design of the clutch 11 and the normal load carried thereby. These conditions may be provided to the microprocessor 12 by means of the start select switches 29. The microprocessor 12 is responsive to such signals for causing the current to follow the appropriate curve when the engagement switch 28 is closed. Alternatively, or in conjunction with the start select switches 29, the microprocessor 12 may be programmed to select one of the curves in response to the status of one or more of the parameters sensed by the sensors 20 through 24.

Figure 3:
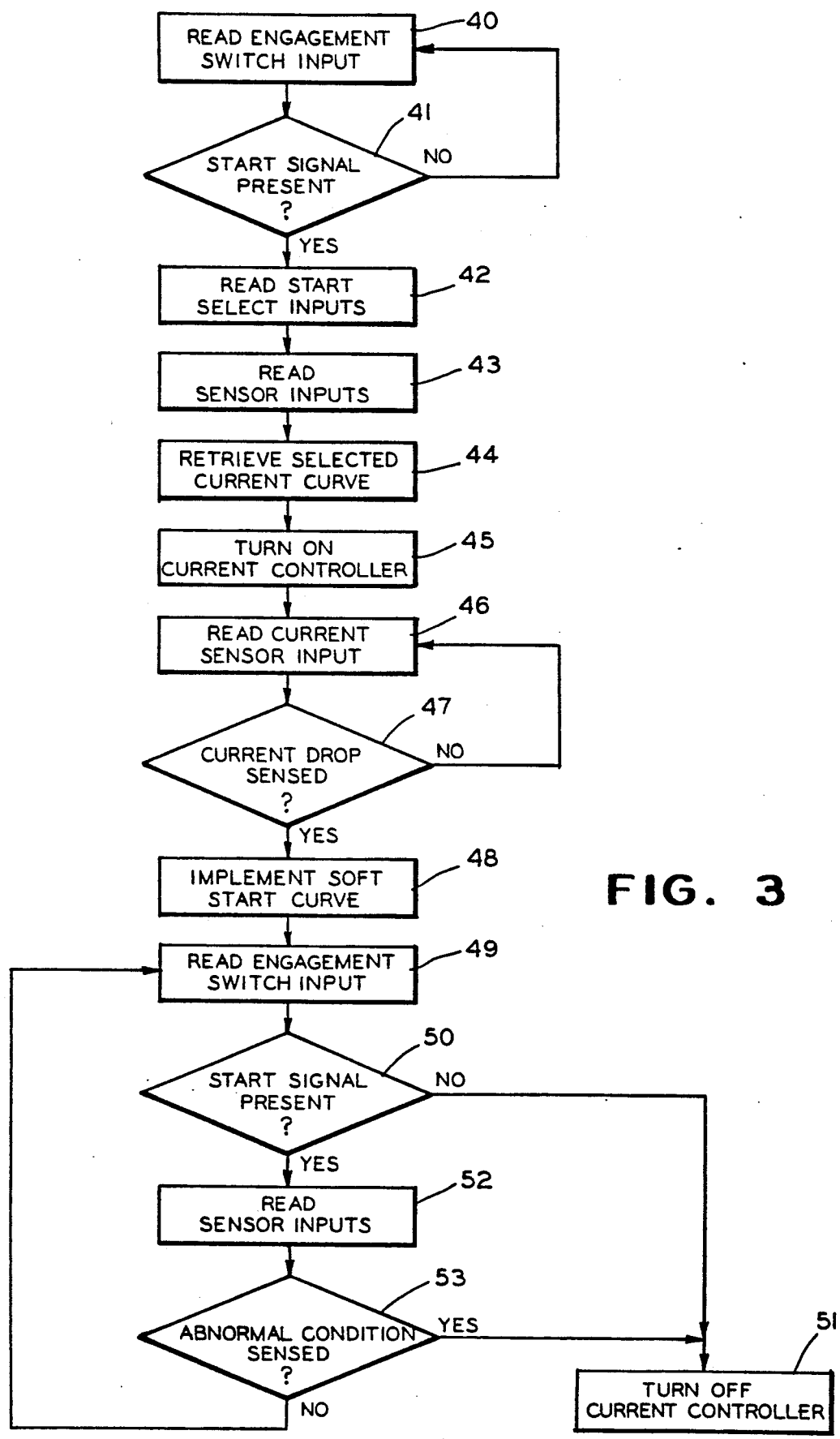
FIG. 3 is a flow chart of a typical program used by the microprocessor in the soft start controller illustrated in FIG. 1.

Referring now to FIG. 3, there is illustrated a flow chart of the program executed by the microprocessor 12. This program is stored in the memory circuit 13 of the controller 10. The program initially executes an instruction 40 to read the condition of the input signal from the engagement switch 28. Next, the program enters a decision point 41 to determine whether a start signal is being generated by the engagement switch 28. If no such signal is being generated, the program branches back to the initial instruction 40. Thus, the microprocessor 12 repeatedly reads the condition of the engagement switch 28 until a start signal is generated thereby.

Once the microprocessor 12 determines that the engagement switch 28 is generating a start signal (indicating that it is desired to engage the clutch 11), the program branches to an instruction 42 to read the condition of the start select switches 29. As mentioned above, the start select switches 29 are set by an operator to provide information to the microprocessor 12 as to the desired nature of engagement of the clutch 11. The program next enters an instruction 43 to read the condition of the various sensors 20 through 24. As mentioned above, the sensors 20 through 24 provide information to the microprocessor 12 regarding the status of various operating parameters of the clutch 11 and the vehicle in which it is used.

The program next executes an instruction 44 to retrieve the appropriate current curve from the memory circuit 13, as determined by the signals from the start select switches 29 and the sensors 20 through 24. Then, the program executes an instruction 45 to turn on the current controller 16 to begin supplying current to the clutch 11. When the current controller 16 is turned on, current begins flowing to the clutch 11, as shown in the initial portion of the curves illustrated in FIG. 2. The program next enters an instruction 46 to read the signal from the current sensor 20. The current sensor 20 constantly monitors the magnitude of this current and generates a representative signal to the microprocessor 12 through the multiplexer 25 and the converter 26.

The program next enters a decision point 47, wherein it is determined whether the momentary current drop (resulting from the onset of armature movement—see peak point 1 on each of the curves illustrated in FIG. 2) has occurred. If not, the program branches back to the instruction 46 to again read the value of the current. Thus, the microprocessor 12 repeatedly reads the value of the clutch current. When the value of the clutch current is less than the previous value, the momentary current drop has occurred. At that point, the program branches to an instruction 48, wherein the selected soft start engagement curve is implemented by the microprocessor 12.

To implement the selected soft start engagement curve, the microprocessor 12 generates a series of pulses of relatively short length over the line 15 to the current controller 16. Consequently, the current controller 16 oscillates between conductive and non-conductive states. The amount of the current supplied to the clutch 11 is proportional to the summation of the pulses over time. The lengths of these pulses are gradually increased by the microprocessor 12 as time passes so as to slowly increase the overall current supplied to the clutch 11. Therefore, the current supplied to the clutch 11 is controlled in accordance with the selected curves illustrated in FIG. 2.

At any given point in time following the current drop, the microprocessor 12 can determine from the stored curved what the desired instantaneous current to the clutch 11 should be. This desired instantaneous current value is compared by the microprocessor 12 with the actual instantaneous current value sensed by the current sensor 20. In response to any significant difference therebetween, the microprocessor 12 can shorten or lengthen the pulses fed to the current controller 16 so as to maintain the acutal current in accordance with the desired current. Thus, using the feedback signal from the current sensor 20, the microprocessor 12 can closely control the engagement of the clutch 11 in a desired manner.

Once the microprocessor 12 has begun to implement the selected soft start engagement curve, the program enters an instruction 49 to again read the condition of the input from the engagement switch 28. Next, the program enters a decision point 50 to determine whether a start signal is still being generated by the engagement switch 28. If the engagement signal is not being generated, the program branches to an instruction 51 to turn off the current controller 16 and thereby disengage the clutch 11. However, if the engagement signal is still being generated, the program branches to an instruction 52 to read the condition of the various sensors 20 through 24.

The program next enters a decision point 53, wherein the values of the sensed conditions are compared with predetermined ranges stored in the memory circuit 13.

These stored ranges represent the normal operating condition of the clutch 11 or the vehicle. If the value of any of the sensed parameters is outside of the stored ranges, an abnormal condition is detected. Thus, the program branches to the instruction 51 to turn off the current controller 16 and thereby disengage the clutch 11. However, if the sensed parameters are within the stored ranges, the program branches back to the instruction 49. Thus, the program continues in a loop, sensing the condition of the input from the engagement switch 28 and the parameters sensed by the sensors 20 through 24 until at some point, the clutch 11 is disengaged.

Thus, it can be seen that both the initial engagement and subsequent operation of the clutch 11 is controlled by the microprocessor 12 in response to various sensed conditions. For example, the speed sensor 21 can determine the speed of the engine when engagement of the clutch 11 is requested. If the speed is too high to insure safe engagement, the microprocessor 12 can override the signal from the engagement switch 28, thereby preventing clutch engagement at an unsafe speed. The temperature sensor 22 can monitor the temperature of the clutch 11. If the clutch 11 becomes too warm, the rate of engagement can be decreased, or the clutch 11 can be disengaged. The vacuum sensor 23 can sense the level of engine vacuum, which is indicative of the load imposed thereon. In response thereto, the microprocessor 12 may delay engagement of the clutch 11 until the load on the engine is reduced, thus preventing stalling. Lastly, the level sensor can sense the angle at which the vehicle is oriented and generate a signal when a predetermined angle is exceeded. This information would be useful if, for example, the clutch was used on a lawn mower to selectively connect a cutting blade to be driven by the engine. If the predetermined vehicle angular orientation was exceeded, the microprocessor 12 would prevent (or disconnect) clutch engagement.

In accordance with the provisions of the patent statutes, the principle and the mode of this invention have been explained and illustrated in its preferred embodiment. However, it must be understood that this invention may be practiced otherwise than as specifically explained and illustrated without departing from its spirit or scope.

What is claimed is:

1. A controller for supplying electrical current to a coil of an electromagnetic clutch to regulate the engagement thereof comprising:
   means for storing a plurality of clutch current engagement curves;
   means for generating a signal when it is desired to engage the clutch;
   means for generating a signal which is representative of the temperature of the clutch; and
   control means responsive to said engagement signal and said temperature signal for selecting one of said stored clutch current engagement curves, for supplying electrical current to the coil of the clutch in accordance with the selected curve, and for decreasing the amount of electrical current supplied to the coil of the clutch if the temperature of the clutch exceeds a predetermined magnitude.

2. The invention defined in claim 1 wherein said clutch is driven by an engine including means for generating a signal which is representative of the speed of the engine, wherein said control means is also responsive to said engine speed signal.

3. The invention defined in claim 1 wherein said clutch is driven by an engine including means for generating a signal which is representative of the vacuum level generated by the engine, wherein said control means is also responsive to said engine vacuum level signal.

4. The invention defined in claim 1 wherein said clutch is mounted in a vehicle including means for generating a signal which is representative of the relative angle at which the vehicle is being operated, wherein said control means is also responsive to said vehicle angle signal.

5. The invention defined in claim 1 further including means for generating signals which are representative of a plurality of operating conditions of the clutch, wherein said control means is also responsive to each of said operating condition signals.

6. The invention defined in claim 5 wherein said means for generating said operating condition signals includes a plurality of sensors, each sensor generating a signal which is representative of an operating condition of the clutch.

7. The invention defined in claim 6 further including means for sequentially sampling each of said sensors and for supplying said sampled sensor signals to said control means.

8. The invention defined in claim 7 wherein said means for sequentially sampling includes a multiplexer connected between each of said sensors and said control means.

9. The invention defined in claim 1 wherein the clutch includes an armature which is movable between engaged and disengaged positions, and wherein said control means is also responsive to a decrease in the magnitude of the electrical current passing through the coil of the clutch caused by the initial movement of the armature from said disengaged position to said engaged position.

10. The invention defined in claim 1 wherein said control means is responsive to said temperature signal for interrupting the supply of electrical current to the coil of the clutch when an abnormal condition is sensed.

11. A controller for supplying electrical current to a coil of an electromagnetic clutch driven by an engine to regulate the engagement thereof comprising:
    means for storing a plurality of clutch current engagement curves;
    means for generating a signal when it is desired to engage the clutch;
    means for generating a signal which is representative of the vacuum level generated by the engine; and
    control means responsive to said engagement signal and said engine vacuum level signal for selecting one of said stored clutch current engagement curves and for supplying electrical current to the coil of the clutch in accordance therewith.

12. The invention defined in claim 11 further including means for generating a signal which is representative of the temperature of the clutch, wherein said control means is also responsive to said clutch temperature signal.

13. The invention defined in claim 11 further including means for generating a signal which is representative of the speed of the engine, wherein said control means is also responsive to said engine speed signal.

14. The invention defined in claim 11 wherein said clutch is mounted in a vehicle including means for generating a signal which is representative of the relative angle at which the vehicle is being operated, wherein said control means is also responsive to said vehicle angle signal.

15. The invention defined in claim 11 further including means for generating signals which are representative of a plurality of operating conditions of the clutch, wherein said control means is also responsive to each of said operating condition signals.

16. The invention defined in claim 15 wherein said means for generating said operating condition signals includes a plurality of sensors, each sensor generating a signal which is representative of an operating condition of the clutch.

17. The invention defined in claim 16 further including means for sequentially sampling each of said sensors and for supplying said sampled sensor signals to said control means.

18. The invention defined in claim 17 wherein said means for sequentially sampling includes a multiplexer connected between each of said sensors and said control means.

19. The invention defined in claim 11 wherein the clutch includes an armature which is movable between engaged and disengaged positions, and wherein said control means is also responsive to a decrease in the magnitude of the electrical current passing through the coil of the clutch caused by the initial movement of the armature from said disengaged position to said engaged position.

20. The invention defined in claim 11 wherein said control means is responsive to said engine vacuum level signal for interrupting the supply of electrical current to the coil of the clutch when an abnormal condition is sensed.

21. A controller for supplying electrical current to a coil of an electromagnetic clutch mounted in a vehicle to regulate the engagement thereof comprising:
means for storing a plurality of clutch current engagement curves;
means for generating a signal when it is desired to engage the clutch;
means for generating a signal which is representative of the relative angle at which the vehicle is being operated; and
control means responsive to said engagement signal and said vehicle angle signal for selecting one of said stored clutch current engagement curves and for supplying electrical current to the coil of the clutch in accordance therewith.

22. The invention defined in claim 21 further including means for generating a signal which is representative of the temperature of the clutch, wherein said control means is also responsive to said clutch temperature signal.

23. The invention defined in claim 21 wherein said clutch is driven by an engine including means for generating a signal which is representative of the speed of the engine, wherein said control means is also responsive to said engine speed signal.

24. The invention defined in claim 21 wherein said clutch is driven by an engine including means for generating a signal which is representative of the vacuum level generated by the engine, wherein said control means is also responsive to said engine vacuum level signal.

25. The invention defined in claim 21 further including means for generating signals which are representative of a plurality of operating conditions of the clutch, wherein said control means is also responsive to each of said operating condition signals.

26. The invention defined in claim 25 wherein said means for generating said operating condition signals includes a plurality of sensors, each sensor generating a signal which is representative of an operating condition of the clutch.

27. The invention defined in claim 26 further including means for sequentially sampling each of said sensors and for supplying said sampled sensor signals to said control means.

28. The invention defined in claim 27 wherein said means for sequentially sampling includes a multiplexer connected between each of said sensors and said control means.

29. The invention defined in claim 21 wherein the clutch includes an armature which is movable between engaged and disengaged positions, and wherein said control means is also responsive to a decrease in the magnitude of the electrical current passing through the coil of the clutch caused by the initial movement of the armature from said disengaged position to said engaged position.

30. The invention defined in claim 21 wherein said control means is responsive to said vehicle angle signal for interrupting the supply of electrical current to the coil of the clutch when an abnormal condition is sensed.

31. A controller for supplying electrical current to a coil of an electromagnetic clutch to regulate the engagement thereof comprising:
means for storing a plurality of clutch current engagement curves;
means for generating a signal when it is desired to engage the clutch;
means for generating signals which are representative of a plurality of operating conditions of the clutch; and
control means for sequentially sampling each of said operating condition signals, said control means being responsive to said engagement signal and each of said operating condition signals for selecting one of said stored clutch current engagement curves and for supplying electrical current to the coil of the clutch in accordance therewith.

32. The invention defined in claim 31 further including means for generating a signal which is representative of the temperature of the clutch, wherein said control means is responsive to said clutch temperature signal.

33. The invention defined in claim 31 wherein said clutch is driven by an engine including means for generating a signal which is representative of the speed of the engine, wherein said control means is responsive to said engine speed signal.

34. The invention defined in claim 31 wherein said clutch is driven by an engine including means for generating a signal which is representative of the vacuum level generated by the engine, wherein said control means is responsive to said engine vacuum level signal.

35. The invention defined in claim 31 wherein said clutch is mounted in a vehicle including means for generating a signal which is representative of the relative angle at which the vehicle is being operated, wherein said control means is responsive to said vehicle angle signal.

36. The invention defined in claim 31 wherein said means for sequentially sampling includes a multiplexer connected between each of said operating condition signal generating means and said control means.

37. The invention defined in claim 31 wherein the clutch includes an armature which is movable between engaged and disengaged positions, and wherein said control means is responsive to a decrease in the magnitude of the electrical current passing through the coil of the clutch caused by the initial movement of the armature from said disengaged position to said engaged position.

38. The invention defined in claim 31 wherein said control means is responsive to said operating condition signals for interrupting the supply of electrical current to the coil of the clutch when an abnormal condition is sensed.

39. A controller for supplying electrical current to a coil of an electromagnetic clutch having an armature which is movable between engaged and disengaged positions to regulate the engagement thereof comprising:

means for storing a plurality of clutch current engagement curves;

means for generating a signal when it is desired to engage the clutch;

means for generating a signal which is representative of the magnitude of the electrical current passing through the coil of the clutch; and control means responsive to said engagement signal and a decrease in the magnitude of the electrical current passing through the coil of the clutch caused by the initial movement of the armature from said disengaged position to said engaged position for selecting one of said stored clutch current engagement curves and for supplying electrical current to the coil of the clutch in accordance therewith.

40. The invention defined in claim 39 further including means for generating a signal which is representative of the temperature of the clutch, wherein said control means is also responsive to said clutch temperature signal.

41. The invention defined in claim 39 wherein said clutch is driven by an engine including means for generating a signal which is representative of the speed of the engine, wherein said control means is also responsive to said engine speed signal.

42. The invention defined in claim 39 wherein said clutch is driven by an engine including means for generating a signal which is representative of the vacuum level generated by the engine, wherein said control means is also responsive to said engine vacuum level signal.

43. The invention defined in claim 39 wherein said clutch is mounted in a vehicle including means for generating a signal which is representative of the relative angle at which the vehicle is being operated, wherein said control means is also responsive to said vehicle angle signal.

44. The invention defined in claim 39 further including means for generating signals which are representative of a plurality of operating conditions of the clutch, wherein said control means is also responsive to each of said operating condition signals.

45. The invention defined in claim 44 wherein said means for generating said operating condition signals includes a plurality of sensors, each sensor generating a signal which is representative of an operating condition of the clutch.

46. The invention defined in claim 45 further including means for sequentially sampling each of said sensors and for supplying said sampled sensor signals to said control means.

47. The invention defined in claim 46 wherein said means for sequentially sampling includes a multiplexer connected between each of said sensors and said control means.

48. The invention defined in claim 39 wherein said control means is responsive to said electrical current signal for interrupting the supply of electrical current to the coil of the clutch when an abnormal condition is sensed.

49. A controller for supplying electrical current to a coil of an electromagnetic clutch to regulate the engagement thereof comprising:

means for storing a plurality of clutch current engagement curves;

means for generating a signal when it is desired to engage the clutch;

means for generating a signal which is representative of an operating condition of the clutch; and control means responsive to said engagement signal and said operating condition signal for selecting one of said stored clutch current engagement curves and for supplying electrical current to the coil of the clutch in accordance therewith and for interrupting the supply of electrical current to the coil of the clutch when an abnormal condition is sensed.

50. The invention defined in claim 49 further including means for generating a signal which is representative of the temperature of the clutch, wherein said control means is responsive to said clutch temperature signal.

51. The invention defined in claim 49 wherein said clutch is driven by an engine including means for generating a signal which is representative of the speed of the engine, wherein said control means is responsive to said engine speed signal.

52. The invention defined in claim 49 wherein said clutch is driven by an engine including means for generating a signal which is representative of the vacuum level generated by the engine, wherein said control means is responsive to said engine vacuum level signal.

53. The invention defined in claim 49 wherein said clutch is mounted in a vehicle including means for generating a signal which is representative of the relative angle at which the vehicle is being operated, wherein said control means is responsive to said vehicle angle signal.

54. The invention defined in claim 49 further including means for generating signals which are representative of a plurality of operating conditions of the clutch, wherein said control means is also responsive to each of said operating condition signals.

55. The invention defined in claim 54 wherein said means for generating said operating condition signals includes a plurality of sensors, each sensor generating a signal which is representative of an operating condition of the clutch.

56. The invention defined in claim 55 further including means for sequentially sampling each of said sensors and for supplying said sampled sensor signals to said control means.

57. The invention defined in claim 49 wherein said means for sequentially sampling includes a multiplexer connected between each of said sensors and said control means.

58. The invention defined in claim 49 wherein the clutch includes an armature which is movable between engaged and disengaged positions, and wherein said control means is also responsive to a decrease in the magnitude of the electrical current passing through the coil of the clutch caused by the initial movement of the armature from said disengaged position to said engaged position.

* * * * *

UNITED STATES PATENT AND TRADEMARK OFFICE
CERTIFICATE OF CORRECTION

PATENT NO. : 5,094,332
DATED : March 10, 1992
INVENTOR(S) : John H. Wall It is certified that error appears in the above-identified patent and that said Letters Patent is hereby corrected as shown below:

Col. 12, line 1, change "49" to -- 56 --.

Signed and Sealed this

Fourth Day of May, 1993

*Attest:*

MICHAEL K. KIRK

*Attesting Officer*   Acting Commissioner of Patents and Trademarks

UNITED STATES PATENT AND TRADEMARK OFFICE
CERTIFICATE OF CORRECTION

PATENT NO. : 5,094,332

DATED : March 10, 1992

INVENTOR(S) : John H. Wall

It is certified that error appears in the above-indentified patent and that said Letters Patent is hereby corrected as shown below:

Column 12, line 67, change "49" to -- 56 --.

This Certificate supercedes the Certificate of Correction issued May 4, 1993.

Signed and Sealed this

Ninth Day of November, 1993

Attest:

BRUCE LEHMAN

Attesting Officer     Commissioner of Patents and Trademarks